Oct. 20, 1942.   H. L. PRANGE   2,299,405
METHOD AND APPARATUS FOR MARKING EDGES OF RIMLESS EYEGLASS LENSES
Filed Sept. 2, 1941
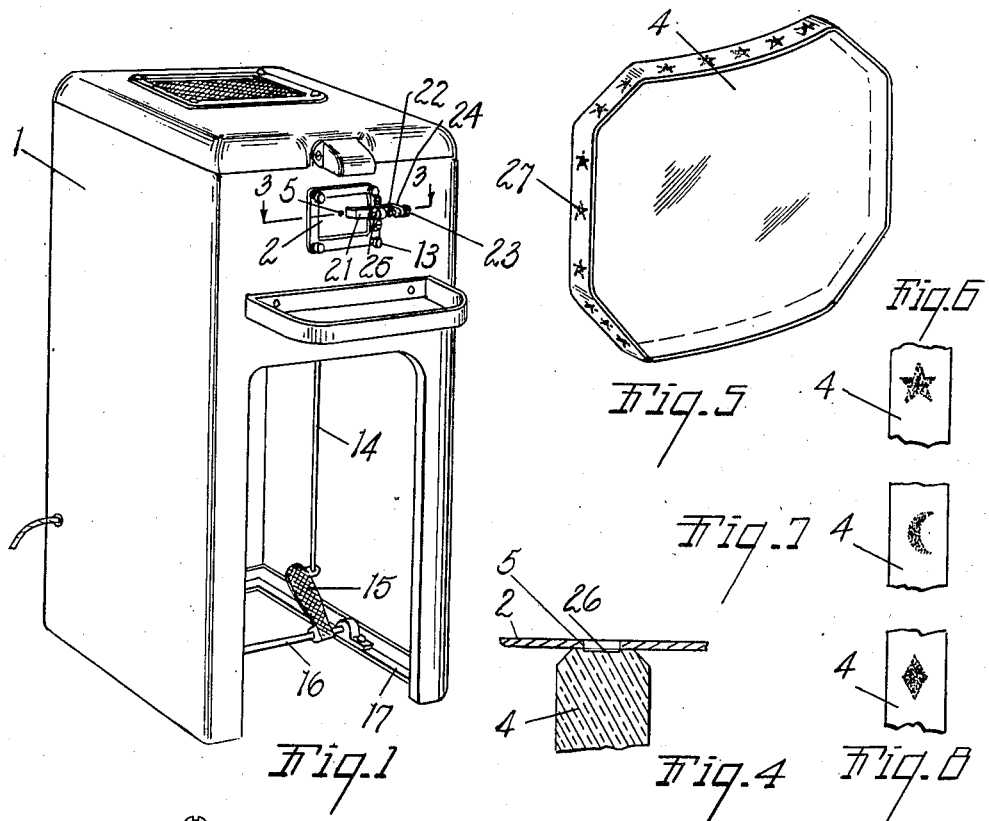
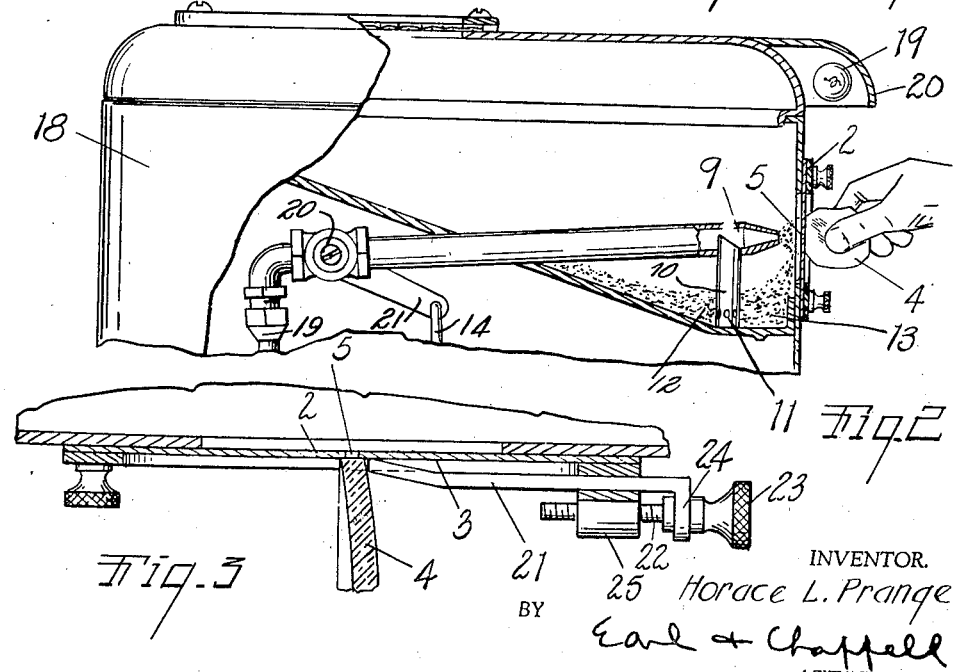
INVENTOR.
Horace L. Prange
BY Earl & Chappell
ATTORNEYS.

Patented Oct. 20, 1942

2,299,405

UNITED STATES PATENT OFFICE 2,299,405

METHOD AND APPARATUS FOR MARKING EDGES OF RIMLESS EYEGLASS LENSES

Horace L. Prange, Kalamazoo, Mich.

Application September 2, 1941, Serial No. 409,253

4 Claims. (Cl. 41—1)

This invention relates to improvements in method and apparatus for marking edges of rimless eyeglass lenses.

This invention relates to method and apparatus for marking rimless eyeglass lenses for identification and for ornamentation. It has for its objects:

First, to provide a new and improved apparatus for marking the edges of rimless eyeglass lenses.

Second, to provide such an apparatus which marks the lenses so that the manufacturer thereof can identify his own lenses when some question arises as to identity.

Third, to provide such an apparatus which so marks the lens that vision therethrough will not be impaired.

Fourth, to provide such an apparatus which is adaptable to use on various lenses of different diameter and thickness and which places the marking on the lens in such a way that the lens is not disfigured but is, in fact, enhanced by the ornamentation.

Fifth, to provide such an apparatus which is simple and inexpensive and which may be easily operated.

Sixth, to provide a new and improved method of marking rimless glasses.

Other objects and advantages pertaining to details and economies will appear from the description to follow. The invention is defined in the claims. A preferred embodiment of my invention is illustrated in the accompanying drawing, in which:

Fig. 1 is a perspective view of an apparatus embodying my invention.

Fig. 2 is a detailed view partly in section from the side of my apparatus with the case broken away to show the internal parts.

Fig. 3 is a detailed sectional view on line 3—3 of Fig. 1, showing the shield or mask with the lens in place thereagainst for ornamentation.

Fig. 4 is a further detail view showing the lens in position after it has been marked.

Fig. 5 is a perspective view of the marked lens.

Figs. 6, 7 and 8 are views showing possible markings to be employed.

The improved apparatus designated generally at 1 consists of a mask or shield 2 made of any suitable metal which has a face or front 3 against which the edge of a lens to be marked, indicated at 4, may be placed, the edge abutting the face. Extending through the shield or mask is an aperture 5. This aperture opens to the face of the mask and is of ornamental shape. It may be a star such as shown at 6, a crescent, as shown at 7, or a diamond, as shown at 8. Other suitable ornamental shapes may be employed.

The aperture 5 is of a width less than the thickness of the lens to be treated. It has been found that as a practical matter the apertures can be made of such a size that they are less than the thickness of the ordinary rimless eyeglass lens.

Behind the shield, I provide a suitable air jet 9 which is directed at the back of the shield 2 and at the aperture 5. This is provided with an injector tube 10 with apertures 11 at the bottom adapted to pick up finely divided abrasive material 12 held in a suitable recess 13 around the bottom of the injector tube 10. The nozzle 9 is controlled by a suitable rod 14 and a foot pedal 15 pivoted on the rod 16 in the base 17 of the apparatus. This pedal is preferably accessible to the operator standing before the face of the apparatus so that the blast can be turned on after positioning the lens with its edge closing the aperture 5 and in abutment with the face 3 of the shield 2. A blast of air is sent through the nozzle 9 from a supply pipe 19. The compressed air in the supply pipe is controlled by a valve 20 having an operating lever 21 to which the rod 14 is pivotally connected.

A suitable casing 18 extends from the edges of the shield 2 and encloses the means for creating the blast of the finely divided abrasive material. Mounted on the casing 18, I may provide a light 19 with a shade 20.

In order to assist in positioning the lens 4 on the face of the shield, I provide an adjustable stop 21 which is controlled by a screw 22 with a knurled handle 23 rotatably supported in the bearing 24 and threadedly engaging the stop at 25. The stop is adjusted so that the aperture 5 is centered on the edge of the lens 4.

In operation the operator of the machine divides and marks the lens evenly about its periphery. The stop is adjusted so that the aperture 5 comes at the center of the edge of the lens. The operator stands or sits in front of the machine and holds the edge of the lens against the face 3 of the shield. The side of the lens is against the stop. The operator then operates the pedal 15 to create a blast of abrasive material against the edge of the lens. This tends to etch the edge of the lens and cut away the glass as shown at 26 in Fig. 4 where a slight exaggeration is made to show the etching action. The operator, after a given period of time necessary to etch the edge, releases the pedal and indexes the lens to the next marked position.

The finished product shown in Fig. 5 is extremely attractive in appearance. The ornamental markings 27 etched on the edge are centered on the edge and are substantially evenly spaced about the periphery of the lens. The lens can be identified by the maker and the markings, rather than detracting from the appearance of the lens or interfering with sight through the lens, enhance the appearance, leaving the lens clear. The edge of the lens may be either polished or unpolished, as desired, after marking.

The terms and expressions which have been herein employed are used as terms of description and not of limitation, and there is no intention, in the use of such terms and expressions, of excluding any equivalents of the features shown and described. It is recognized that various modifications are possible within the scope of the invention claimed.

Having thus described my invention what I claim as new and desire to secure by Letters Patent is:

1. In an apparatus for marking the edges of rimless eyeglass lenses, the combination of a shield having a face adapted to receive and abut the edge of a rimless eyeglass lens, an aperture of ornamental shape through said shield and opening to said face and of a width less than the thickness of the edge of a rimless eyeglass lens to be treated on said apparatus and adapted to be closed by such an edge, an adjustable stop adjacent said aperture at the face of said shield adapted to engage the side of a rimless eyeglass lens, means for creating a blast of finely divided abrasive positioned to direct such blast at the back of said shield and through said aperture, means accessible to an operator at the face of said shield to control said means for creating a blast, and a casing extending from the edges of said shield and enclosing said means for creating a blast.

2. In an apparatus for marking the edges of rimless eyeglass lenses, the combination of a shield having a face adapted to receive and abut the edge of a rimless eyeglass lens, an aperture of ornamental shape through said shield and opening to said face and of a width less than the thickness of the edge of a rimless eyeglass lens to be treated on said apparatus and adapted to be closed by such an edge, a stop adjacent said aperture at the face of said shield and positioned to engage the side of a rimless eyeglass lens with said aperture centered on said edge, means for creating a blast of finely divided abrasive positioned to direct such blast at the back of said shield and through said aperture, means accessible to an operator at the face of said shield to control said means for creating a blast, and a casing extending from the edges of said shield and enclosing said means for creating a blast.

3. In an apparatus for marking the edges of rimless eyeglass lenses, the combination of a shield having a face adapted to receive and abut the edge of a rimless eyeglass lens, an aperture of ornamental shape through said shield and opening to said face and of a width less than the thickness of the edge of a rimless eyeglass lens to be treated on said apparatus and adapted to be closed by such an edge, an adjustable stop adjacent said aperture at the face of said shield adapted to engage the side of a rimless eyeglass lens, means for creating a blast of finely divided abrasive positioned to direct such blast at the back of said shield and through said aperture, and a casing extending from the edges of said shield and enclosing said means for creating a blast.

4. In an apparatus for marking the edges of rimless eyeglass lenses, the combination of a shield having a face adapted to receive and abut the edge of a rimless eyeglass lens, an aperture of ornamental shape through said shield and opening to said face and of a width less than the thickness of the edge of a rimless eyeglass lens to be treated on said apparatus and adapted to be closed by such an edge, a stop adjacent said aperture at the face of said shield and positioned to engage the side of a rimless eyeglass lens with said aperture centered on said edge, means for creating a blast of finely divided abrasive positioned to direct such blast at the back of said shield and through said aperture, and a casing extending from the edges of said shield and enclosing said means for creating a blast.

HORACE L. PRANGE.